A. MOON.
CUSHION WHEEL.
APPLICATION FILED NOV. 22, 1911.

1,053,852.

Patented Feb. 18, 1913.

Witnesses:
Christ Feinle, Jr.
E. Edmonston

Inventor,
Arch Moon.
By Victor J. Evans,
Attorney.

UNITED STATES PATENT OFFICE.

ARCH MOON, OF FALLON, NEVADA.

CUSHION-WHEEL.

1,053,852.  Specification of Letters Patent.  Patented Feb. 18, 1913.

Application filed November 22, 1911. Serial No. 661,784.

*To all whom it may concern:*

Be it known that I, ARCH MOON, a citizen of the United States, residing at Fallon, in the county of Churchill and State of Nevada, have invented new and useful Improvements in Cushion-Wheels, of which the following is a specification.

This invention relates to wheels and more particularly to spring wheels.

The principal object of the invention is to provide a simple and efficient wheel of this character which will be sufficiently resilient to absorb all normal shocks and which will have sufficient rigidity to withstand all circumstantial strain to which the wheel will be subjected.

A further object of the invention is the provision of a wheel having its spokes constructed in pairs and hinged at both ends and having means to brace the spokes, said spokes being attached to the wheel in such a manner in which they may be readily removed therefrom from one side of the hub.

A further object of the invention will appear as the following specific description is read in connection with the accompanying drawing which forms a part of this application and in which:—

Figure 1:
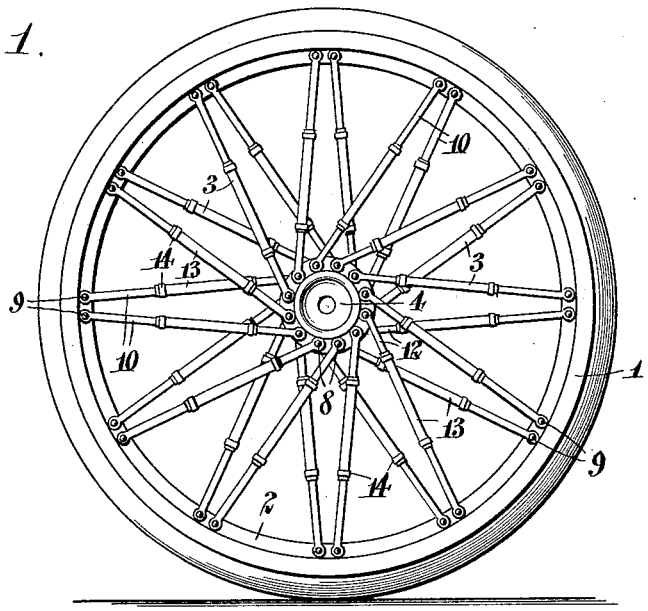
Figure 2:
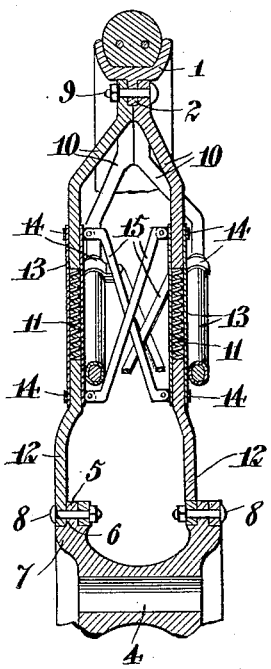

Figure 1 is a side elevation of the wheel. Fig. 2 is a sectional view showing one of the spokes and a portion of the hub.

Referring more particularly to the drawing, 1 represents the felly of the wheel which is constructed so as to receive a tire of any suitable character and is provided with an internal annular flange 2 to which the spokes 3 are pivoted. The hub is shown at 4 and is provided with circular flanges 5 having suitable recesses or sockets 6 in which the spokes are seated, the ends of the spokes resting against a shoulder 7 to prevent them from shearing the pivoted bolts 8.

These spokes are formed in pairs and are connected to the flange 2 by bolts 9, diverging therefrom into separate legs 10 which rest upon the outer end of the coil spring 11. The inner ends of the spokes 12 which are pivotally attached to the hub by the bolts 8 are engaged with the lower or inner end of the coil springs and in order to hold the separate parts of each pair of spokes in alinement the ends of the parts and their respective springs are surrounded by tubes 13 which are held in position so as to permit the spokes to slide therein by brace clips 14 connected together by cross bars 15 which extend diagonally between the spokes and cross each other.

It will be noticed that all of the spokes extend substantially at a tangent to the hub and that, while one pair of spokes is having its springs pressed, the opposite pair of spokes is having its separate parts spread so as to permit expansion of the springs therein.

Having thus described the invention, what I claim as new is:—

1. In combination, a hub, a felly and spokes interposed between the hub and felly and comprising fork pivoting members connected to the felly, hub connecting members secured to opposite sides of the hub, tubes surrounding the fork members and the hub members, springs interposed between the ends of said members, and diagonally extending braces arranged between opposite ends of the opposite tubes.

2. In combination, a hub, a felly, and spokes arranged between the hub and felly and each comprising a fork member pivoted to the felly and extending toward the hub, independent hub members pivoted to the hub and extending toward the felly, tubes loosely surrounding the legs of the fork member and the ends of the members which are connected to the hub, diagonal brace rods extending between opposite ends of opposite tubes and pivotally connected thereto, and springs arranged in the tube and interposed between the ends of the hub and felly members.

In testimony whereof I affix my signature in presence of two witnesses.

ARCH MOON.

Witnesses:
ROLLY R. HAM,
FRED STRASSBURG.

Copies of this patent may be obtained for five cents each, by addressing the "Commissioner of Patents, Washington, D. C."